T. MIECZEJESKI.
MILK BOILER.
APPLICATION FILED OCT. 2, 1919.

1,333,330.

Patented Mar. 9, 1920.
2 SHEETS—SHEET 1.

Inventor
T. Mieczejeski

By A. M. Wilson
Attorney

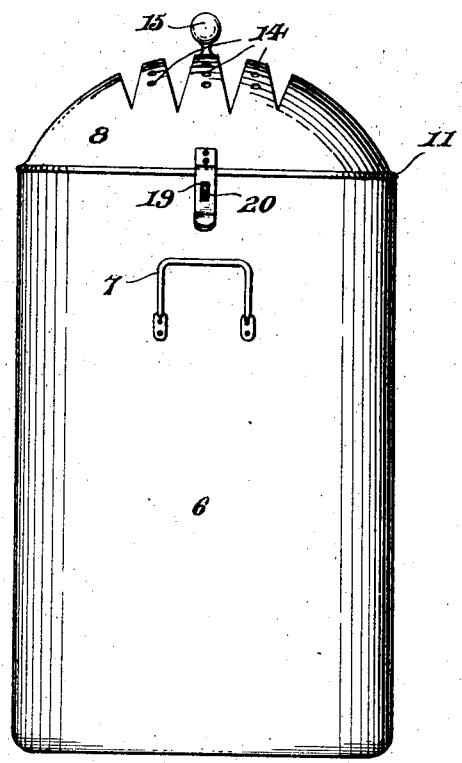
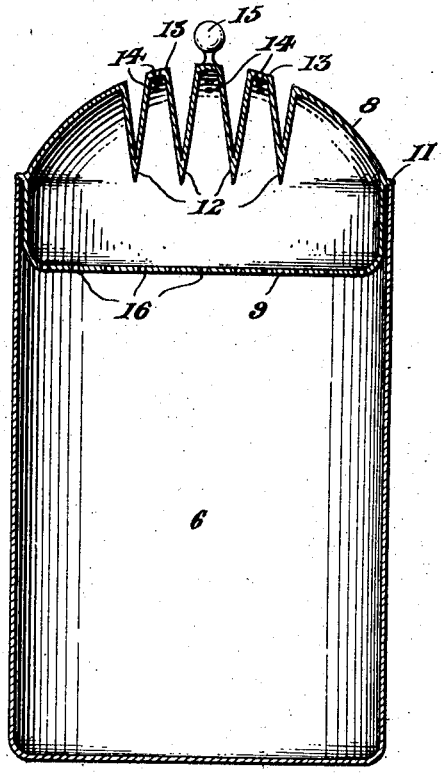
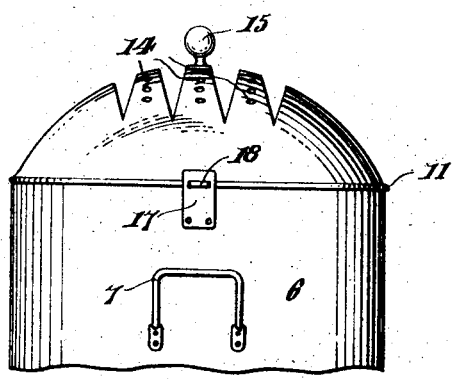

UNITED STATES PATENT OFFICE.

TONY MIECZEJESKI, OF ROSEMONT, WEST VIRGINIA.

MILK-BOILER.

1,333,330.

Specification of Letters Patent. Patented Mar. 9, 1920.

Application filed October 2, 1919. Serial No. 327,894.

*To all whom it may concern:*

Be it known that I, TONY MIECZEJESKI, a citizen of Poland, residing at Rosemont, in the county of Taylor and State of West Virginia, have invented certain new and useful Improvements in Milk-Boilers, of which the following is a specification.

The primary object of the present invention resides in the provision of a milk boiler embodying an improved cover provided with a plurality of heat radiating ribs that are adapted to contact the boiling milk for purposes of condensing the same for returning to the body of milk in the boiler.

A further object of the invention consists of a milk boiler having a compartment cover adapted to return condensation to the boiler and coöperating with the boiler to be automatically locked thereon when placed in position.

Figure 1:
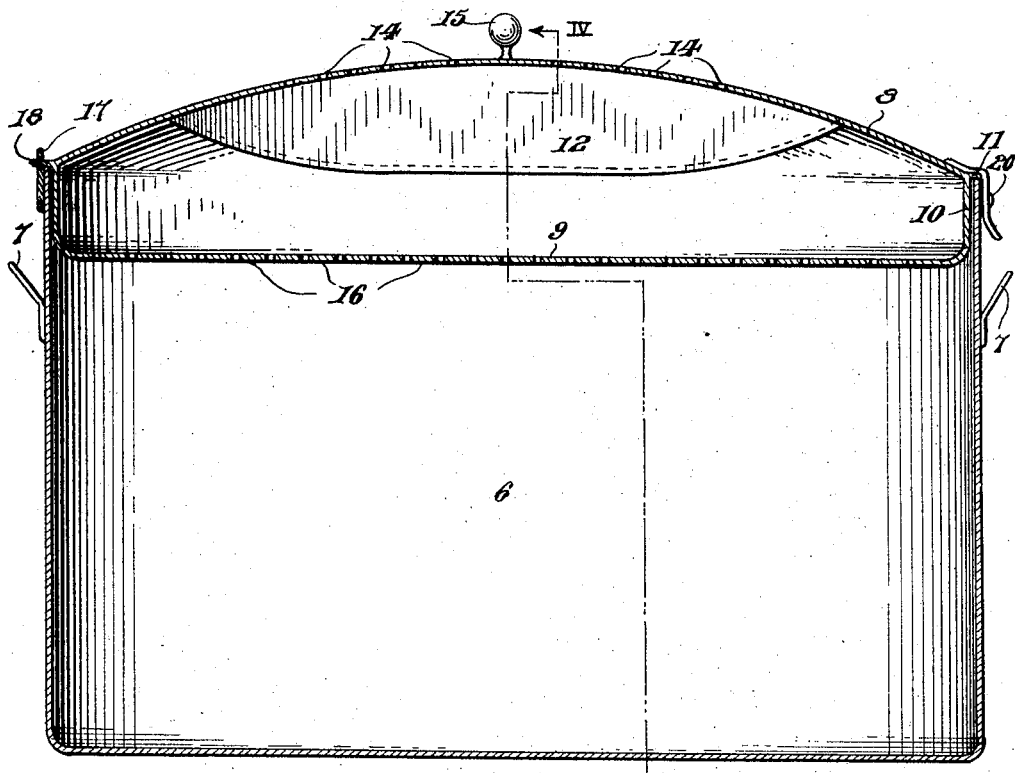
Figure 2:
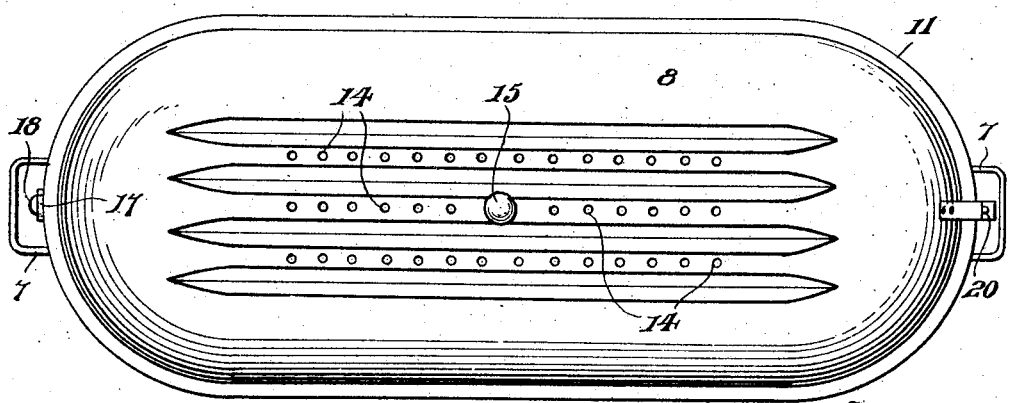

With the above general objects in view and others that will become apparent as the nature of the invention is better understood, the same consists in the novel construction, combination and arrangement of parts to be hereinafter more fully described and then claimed, reference being had to the accompanying drawings by like characters indicating corresponding parts throughout the several views, and in which, Figure 1 is a vertical longitudinal sectional view of a milk boiler constructed in accordance with the present invention, Fig. 2 is a top plan view thereof showing the perforations in the cover to permit the escape of vapor, Fig. 3 is an end elevational view thereof showing the latch connection between one end of the cover and the boiler, Fig. 4 is a vertical cross sectional view taken on line IV—IV of Fig. 1 showing the V-shaped condensing surfaces of the cover, and Fig. 5 is a detail fragmentary end elevational view of the opposite end of the boiler shown in Fig. 3.

Briefly described, the present invention aims to provide a boiler especially designed for the boiling of milk wherein there is provided a body portion and a cover, the cover being of spaced double wall construction both of which are perforated to permit the escape of steam from within the boiler while depending ribs carried by the upper wall of the cover constitute condensing surfaces for boiling fluid which will drip upon the bottom wall of the cover and percolate therethrough to the boiler.

Referring more in detail to the accompanying drawings, the reference numeral 6 designates a boiler of any preferred design having lifting handles 7 with an open upper end closed by a compartment cover as illustrated in Figs. 1 and 4.

The cover comprises an upper arched wall 8 connected to the lower flat wall 9 by a side wall 10, the point of connection between the arched upper wall 8 and the side wall 10 being provided with an annular flange 11 for seating upon the upper edge of the boiler 6, the connecting side wall 10 of the cover being entirely disposed within the boiler.

A plurality of longitudinally extending ribs 12 depend from the cover wall 8 in directions toward the bottom wall 9, the ribs 12 being substantially V-shaped in cross section with the lower edges thereof curved upwardly at the ends and terminating at points spaced from the side walls 10 while the upper longitudinal rib portions 13, separating ribs are provided with a series of perforations 14, the central rib as illustrated in Fig. 4 being provided with a knob 15 for transporting the cover. The bottom wall 9 of the cover is perforated over the entire surface thereof as at 16.

A latch mechanism is provided for retaining the cover in position on the boiler and includes a plate 17 secured to one end of the boiler 6 and projecting above the upper edge thereof with an opening therein in line with the flange 11 upon the cover, the flange 11 carrying a pin projection 18 adjacent the slot in the plate 17 for reception therein. A tensioned latch 19 is carried by the opposite end of the cover wall 8 and is provided with an aperture therein adapted to receive the pin 20 projecting from the adjacent end of the boiler 6 for retaining the cover in position on the boiler. From the above detail description of the device, it is believed that the construction and operation will at once be apparent, it being noted that the cover is mounted upon the boiler by first passing the pin 18 into the slot of the fastening plate 17 after which the latch 19 is automatically received on the pin 20. When the fluid contents of the boiler rises the same is permitted to pass through the perforated bottom 9 of the cover into the space between the walls of the cover and by further upward movement contact the heat radiating ribs 12 and be condensed thereby and returned to the perforated bottom 9 of the cover for percolation to the boiler 6. The perforations 14 in the connecting portions between the V-shaped ribs permit an escape of steam so that the boiler will not be airtight. With this form of cover, the contents of the boiler may boil indefinitely without danger of escaping from the upper end of the boiler as the ribs 12 will condense the boiling fluid and also retard the escape of vapors.

While there is herein shown and described the preferred embodiment of the invention, it is to be understood that minor changes may be made therein that will fall within the scope of the invention as claimed.

What is claimed as new is:—

1. A device of the class described comprising a boiler, a cover therefor, said cover including upper and lower spaced walls, the lower wall being perforated over its entire surface, and a plurality of depending ribs carried by the upper wall, said upper wall having a series of perforations therein.

2. A device of the class described comprising a boiler, a cover therefor, said cover including upper and lower spaced walls, and a plurality of ribs extending longitudinally of the upper cover wall, both of said walls being perforated.

3. A device of the class described comprising a boiler, a cover therefor, said cover including upper and lower spaced walls, a plurality of ribs extending longitudinally of the upper cover wall, both of said walls being perforated, and means for holding the cover on the boiler.

4. A device of the class described comprising a boiler, a cover therefor, said cover including spaced upper and lower walls, and V-shaped ribs depending from the upper wall toward the lower wall and confined within the space between the two walls, both of said walls having perforations therein.

In testimony whereof I affix my signature.

TONY MIECZEJESKI.